(12) United States Patent
Kelly

(10) Patent No.: US 8,729,445 B2
(45) Date of Patent: May 20, 2014

(54) LOAD-MATCHED PHOTO-VOLTAIC POWER UNIT

(75) Inventor: Nelson A. Kelly, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 211 days.

(21) Appl. No.: 13/347,872

(22) Filed: Jan. 11, 2012

(65) Prior Publication Data

US 2013/0175862 A1 Jul. 11, 2013

(51) Int. Cl.
*H02J 1/00* (2006.01)

(52) U.S. Cl.
USPC .................. 250/203.4; 307/24; 126/572

(58) Field of Classification Search
USPC ..... 250/203.1, 203.3, 203.4, 214 R, 214 SW; 702/60, 61, 182; 307/24, 31; 136/244, 136/251; 126/572, 574
See application file for complete search history.

(56) References Cited

U.S. PATENT DOCUMENTS

2007/0119718 A1* 5/2007 Gibson et al. ............... 205/637
2010/0332167 A1* 12/2010 Nuotio et al. ................. 702/65

OTHER PUBLICATIONS

Nelson A. Kelly et al.; Generation of high-pressure hydrogen for fuel cell electric vehicles using photovoltaic-powered water electrolysis; International Journal of Hydrogen Energy 36 (2011) 15803-15825.

* cited by examiner

*Primary Examiner* — Kevin Pyo
(74) *Attorney, Agent, or Firm* — Reising Ethington P.C.

(57) ABSTRACT

Load-matched photo-voltaic power units incorporating a plurality of photo-voltaic cells for delivery of electrical power are described. A photo-voltaic system incorporates temperature and solar irradiance sensors, whose outputs are used to estimate the photo-voltaic system maximum power output voltage. Appropriate numbers of cells are suitably interconnected to assemble at least one photo-voltaic power unit intended to both satisfy the electrical requirements of a load and enable operation of the unit at an efficiency of 90% or greater of its maximum efficiency. In an embodiment, voltage-to-voltage convertors may be used to better match the photo-voltaic power unit capabilities to the load requirements. In another embodiment an alert is issued if the photo-voltaic power unit delivers a voltage which differs by a predetermined amount from an estimated maximum power voltage.

18 Claims, 6 Drawing Sheets

LOAD-MATCHED PHOTO-VOLTAIC POWER UNIT

TECHNICAL FIELD

This disclosure pertains to methods for efficient operation of a photo-voltaic solar power generation source under varying incident light intensities, variable power generation source operating temperatures, and with a varying load.

BACKGROUND OF THE INVENTION

The statements in this section merely provide background information related to the present disclosure and may not constitute prior art.

There is increasing interest in using electricity generated from renewable resources to supplement or replace the electricity generated by burning fossil fuels. One possible source of such renewable electrical energy is solar energy harvested by photo-voltaic (PV) solar cells.

A PV solar cell is the simplest configuration for converting solar energy into electricity. It is a semiconductor with a p-n junction. Often solar cells are silicon-based and may be single crystal, polycrystalline or amorphous. Compound semiconductor-based PV cells employing compound semiconductor materials such as CdTe and $CuInSe_2$, though less common, also find application. For greater efficiency cells may be constructed in multiple layers, each layer being of a composition adapted to efficiently capture the energy in a specific portion of the solar spectrum, a practice referred to as "spectrum-splitting".

Most commercial solar cells convert solar energy to electrical energy with an efficiency of about 20% or less. So under full sun, in mid-latitudes corresponding to an incident solar irradiance of about 1000 watts/sq. meter, most PV cells may output only 200 watts/sq. meter or so of electrical energy. Even at the top of the earth's atmosphere the solar irradiance will be less than 1500 watts/sq. meter and in the lower atmosphere values of greater than 1000 are usually attributable to some enhancement due to scattering from reflective surfaces including clouds outside the solar disc. Thus high power PV systems must collect extensive solar power. This may be done by collecting radiation from a wide area and concentrating the energy on a cell of smaller area using mirrors, lenses or other optical devices. More commonly, though, the solar cell area is simply increased by interconnecting and commonly-packaging individual solar cells into larger groupings. Such groupings are often manufacturer-specific and permanent with no opportunity for users to alter or tune the grouping to achieve an output other than that specified by the manufacturer. These groupings are called modules. In turn these modules may be further assembled and connected in series and parallel configurations to generate useful electrical power. Such assemblies are often called arrays. This terminology is in wide use and generally accepted by those skilled in the art. But the electrical characteristics of modules and arrays are not standardized across the industry, and, as noted there is minimal opportunity to alter the cell interconnections within the module. For this reason, the descriptions and discussion herein will use the term PV cell or photo-voltaic cell to connote an individual cell and the terminology, group or grouping of (photo-voltaic) cells to describe any assemblage of electrically interconnected PV cells whether or not the cells are commonly packaged. Thus in industry terminology an exemplary group or grouping could include a number of interconnected individual cells, one or more modules, one or more arrays, or any combination of these.

Typically the voltage delivered by an individual single-layer PV cell is less than a volt while even multilayer cells usually attain little more than two volts. These potentials are less than the voltage required by most electrical or electronic devices, so, to increase the available voltage, a plurality of PV cells is usually grouped by being wired together in series. The current available from such a series-connected PV cell grouping is the same as may be obtained from a single PV cell, only the voltage is increased.

Connecting PV cells in parallel provides more current than a single cell, but at the same voltage. By appropriately connecting the cells of the grouping in both series and parallel as required, the grouping may be adapted to provide a predetermined current at a prescribed potential or voltage. Hence, by appropriately interconnecting PV cells in both series and parallel, a photo-voltaic power unit of suitable current and voltage capability may be assembled.

Because of the nature of PV cells, the solar power which may be harvested by such a cell/module/array is also very sensitive to the requirements of the device (electrical load) to which it is connected. For a given solar irradiance and PV cell temperature, PV cells are capable of developing a voltage which depends on the PV cell composition and the characteristics of the semiconductor p-n junction. But, when connected to an electrical load, the operating voltage delivered to the load will be limited to the voltage demanded by the load device. This may mean that the power delivered by the PV cell may be less than the maximum value that the PV cell is capable of generating. Hence the key to efficient use of solar energy is to operate the PV cell at the voltage where it delivers maximum power to the load. In commercial PV power units, maximum power output is delivered at a particular voltage termed the maximum power point voltage or $V_{MPP}$.

So any photo-voltaic power source should be matched to a load by substantially matching its $V_{MPP}$ to the operating voltage of the load, and such matching should be maintained despite any variability in PV output. Variability may be result, for example, from changes in solar irradiance, and may be long-term, resulting from the seasonal and diurnal variations in solar irradiance or short-term resulting, for example, from passing clouds.

There is therefore a need for a PV system whose output may be dynamically adjusted to conform to the needs of the load devices powered by the PV power units. Such a system may require a control system and suitable sensors to identify and make appropriate adjustment to the PV system configuration to compensate for both predictable and unpredictable variation in the solar power incident on the PV system.

SUMMARY OF THE INVENTION

A plurality of PV cells may be brought together to form a PV system. Some of the PV cells may be grouped and interconnected to develop electricity generally matched to the requirement of a particular electrical load. Such an interconnected PV cell grouping, directed to a specific load, may be termed a PV power unit. Preferably the PV system may incorporate a number of PV power units so that it may power a number and variety of devices, each with individual electrical requirements, particularly voltage requirements. Such devices may include batteries under charge, hydrogen electrolysers, electrical appliances or motors and electronic units. Under this operating scenario the PV system may not be operating at or near its optimum conditions under variable climatic or seasonal conditions so that at least some available solar power is being wasted.

This invention seeks to have a PV system comprising one or more PV power units operate at its maximum power point voltage. In a PV system comprising a number of PV power units each powering a discrete device, this is done by estimating the maximum power point voltage ($V_{MPP}$) of each PV power unit. The estimated $V_{MPP}$ of the PV power unit is then compared to the measured voltage actually delivered by the PV power unit. If the difference between the measured voltage and the estimated $V_{MPP}$ is considered excessive then one of three actions results. A first action is that an alert is sounded or otherwise communicated; a second action is to bring the estimated $V_{MPP}$ and the measured voltage into acceptably close agreement using a voltage convertor; and a third action is to reconfigure the PV power unit, by adding or subtracting cells or cell groupings, to achieve acceptably close matching of the estimated $V_{MPP}$ and the measured voltage. It is anticipated that the estimated $V_{MPP}$ and the measured voltage will be monitored and compared frequently, typically at regular intervals of preferably a minute or less, and that remedial action may be undertaken with equal frequency if required.

The inventor has determined that $V_{MPP}$ may be estimated from the measured solar irradiance and the measured solar cell temperature. The accuracy of such estimation is very high and has been demonstrated to be within a few percent of the measured value. The voltage delivered by the PV power unit may be readily measured. Any difference, no matter how small, between $V_{MPP}$ and the measured voltage indicates that the PV power unit is operating at less than peak efficiency. But a PV power unit operating in a voltage range in which it is delivering about 90% or more of the harvested solar energy to a load is normally considered to be performing acceptably.

In an embodiment, any difference between estimated and measured voltages beyond some pre-set window may be used as a fault indicator to trigger one or multiple alarms, for example a visual notification such as a light, an audible notification such as a siren, or an electronic notification such as an e-mail, among others. Such notifications may be combined. Typically such a fault would only be triggered if the PV operating voltage differed so significantly from the estimated PV maximum power point voltage that some failure or significant degradation of the PV system might reasonably be inferred. A voltage difference large enough to be indicative of a fault may be 'learned' by tracking the voltage differences generated during normal operation and setting a fault threshold at a greater voltage difference than that observed under normal operating conditions.

In a second embodiment, suited for a PV system with more than one PV power unit, a voltage convertor is interposed between each PV power unit and its associated load. Such a voltage convertor may accept the input of the PV power unit and, through internal circuitry and under the direction of a controller, alter the voltage and output a voltage suitable for the load. The convertor may serve to convert direct current to direct current (DC-DC) or direct current to alternating current (DC-AC), often called an inverter. The convertor may increase (boost) and/or reduce (buck) the input voltage. In this embodiment where the convertor operates under the direction of a controller, the controller uses the estimated $V_{MPP}$ as the input voltage, or set point, for the voltage convertor. The gain of the voltage convertor may be adjusted, by the controller, to provide the appropriate output voltage for the load.

In this embodiment of the invention the PV power unit may be operated at its $V_{MPP}$ while the convertor effectively electrically isolates the PV power unit from the load. Then, under the action of a controller, the settings of the convertor may be adjusted, near-continuously if required, so that the output voltage is maintained compatible with the load.

In this second embodiment, the partition of the PV system into a plurality of PV power units may be permanent. That is, the PV cells of the PV system are grouped and configured into PV power units each of which is operating at its $V_{MPP}$. The voltage convertor is relied upon to continually ensure that each load is powered by an appropriate voltage even under low solar irradiance or high cell temperature when $V_{MPP}$ may be reduced significantly or under high solar irradiance at low cell temperature when $V_{MPP}$ may exceed the load or device requirements In a third embodiment, the PV system is adaptable or dynamically reconfigurable and consists of a plurality of PV cells, only some of which may be permanently interconnected while at least some of at least some of the PV cells or cell group is have remotely-operable electrical connectors such as relays or solid state switches. In this embodiment any difference between the estimated $V_{MPP}$ and the measured operating voltage may be addressed by dynamically switching PV cells or cell groupings into or out of the PV system until the voltage delivered by the PV system, operating at $V_{MPP}$, matches the requirements of the load. Since the voltage of the PV system will be the sum of the individual cell, or grouping voltages if the cells are connected in series, adjustment of the PV system voltage will be enabled by adding or subtracting cells or groupings in series connection. The switching may be enabled by a controller capable of both estimating $V_{MPP}$ and of operating the remotely-operable electrical connections, While it is feasible, in all three embodiments, to accommodate large initial voltage mis-matches, it is preferred to pre-configure each PV power unit to provide a voltage which is generally well-matched to the load voltage. Preferably the initial difference between the estimated $V_{MPP}$ and the required output voltage is less than 10% of $V_{MPP}$, and, more preferably less than 5% of $V_{MPP}$. Also, preferably the initial $V_{MPP}$ should be selected to be equal to or less than the load operating voltage, because the PV power drops dramatically at voltages higher than $V_{MPP}$ and a PV power unit will deliver no power whatsoever at a voltage above the open-circuit voltage, $V_{OC}$. The preconfigured PV power unit may also be designed to meet the current or power needs of the load by grouping a suitable number of cells connected in parallel. An appropriate number of these groupings may then be connected in series to form a PV power unit which will satisfy the voltage requirements of the load.

Other objects and advantages of the invention will be apparent from a detailed description of various embodiments of the invention.

DESCRIPTION OF PREFERRED EMBODIMENTS

The following description of the embodiment(s) is merely exemplary in nature and is not intended to limit the invention, its application, or uses.

Harnessing solar energy offers an opportunity to displace some of the electricity now generated by fossil-fueled power plants. Such solar-generated direct current (DC) electricity, may, with suitable conditioning, be made compatible with a wide range of electrical and electronic devices. However a solar irradiance of greater than 1000 watts/sq. meter is infrequent and at an efficiency of about 20% or so, typical of commercially available PV cells, a significant cell area, obtained by connecting individual cells in parallel, may be required to generate adequate power or current for some loads and devices.

Individual solar cells generate electricity at a potential of less than about 2 volts, but higher voltages may be achieved by connecting PV cells in series. Hence, cells may be connected in series or parallel, or, most commonly. in both series and parallel, to produce a rated voltage and current under industry-recognized standard conditions. In subsequent sections, the generic terms PV power unit and PV system will be used. A PV power unit comprises some number of PV cells grouped and connected together, in series and parallel, to provide electrical power to a load or electrical power-consuming device. The grouping of cells may be permanent or temporary. A PV system comprises a plurality of PV cells, at least some of which may be connected into PV power units.

In assembling PV power units it is preferred that all the solar devices be nominally identical. In general any assemblage of solar devices will be only as effective as the most poorly performing device so that substitution of even a single poorly-performing device in the group will limit the output of the entire assembly. Specifically, cells connected in parallel should exhibit the same maximum power point voltage, $V_{MPP}$, and cells connected in series should exhibit the same maximum power point current, $I_{MPP}$. In all subsequent sections it will be assumed that a PV assembly comprises PV cells conforming to a uniform specification.

Figure 1:
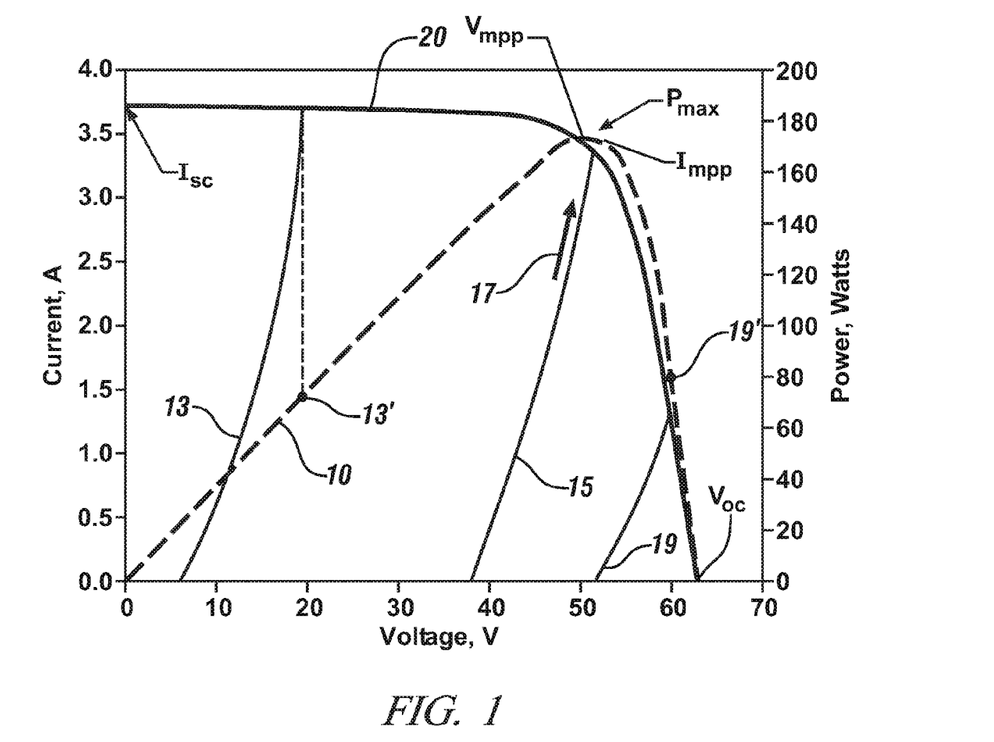
FIG. 1 schematically illustrates the current-voltage and power-voltage characteristics of a Sanyo HIP-190BA3 PV module. Current-voltage curves for several loads, including a load consisting of multiple electrolyser cells arranged in series, are also shown.

PV power units have the further characteristic that they deliver only as much voltage as a device requires. As may be seen in FIG. 1, representative of a particular solar module (Sanyo HIP-190BA3 PV), the current-voltage electrical characteristics of a PV power system, curve 20, approximates a constant current power source (characterized by a short circuit current, $I_{SC}$ which is independent of voltage, up to a maximum (open circuit) voltage $V_{OC}$. Since a PV power unit provides direct current and power is simply the product of voltage and current, this current-voltage characteristic results in a power-voltage characteristic for a PV system like that of curve 10. Initially the power output of the PV power unit shows a gradual linear increase with increasing PV voltage before reaching a maximum at $V_{MPP}$ (maximum power point voltage) and abruptly declining with further increase in voltage. It is apparent from inspection of the power versus voltage curve that for maximum power, such a PV power unit is more tolerant of operation at a voltage less than $V_{MPP}$ than above $V_{MPP}$.

In FIG. 1, curve 15, is illustrative of the current-voltage characteristics of a variable load, in this case some number of electrolyser cells arranged in series. Curve 15 represents, as a continuous curve the current-voltage behavior of a set of 24 electrolyser cells in series as the operating voltage of the electrolyzer is increased. The data of curve 15 was developed using a conventional DC power supply with a variable voltage output. At voltages below about 38 volts or so no electrolysis occurs and so substantially zero current draw results. At voltages greater than 38 volts electrolysis occurs, and, with further increase in voltage, the current progressively increases, following the arrow 17. The intersection of the PV power unit and electrolyzer current-voltage curves represents the operating point of the combined PV power unit-electrolyzer system under the conditions at which their respective current-voltage curves were obtained. The most relevant conditions include, for the PV power unit, the incident irradiance and its temperature, and for the electrolyzer, the electrolysis cell temperature.

In the example shown, the characteristics of the PV power unit are well matched to the needs of the load (electrolyzer) unit. The efficiency of the matching is demonstrated by noting that the electrolyser the current-voltage load curve 15 'walks' into intersection with the PV power unit current-voltage curve 20 at a voltage substantially equal to the maximum power point voltage $V_{MPP}$. Of course, operation of the PV power unit at $V_{MPP}$ enables the PV power unit to deliver its maximum power, $P_{MAX}$. When powering less well-matched loads, represented by alternate current-voltage load curves 13 and 19, the PV power unit delivers less than half the power (about 80 watts (see 13', 19') versus about 180 watts) than it does when powering the well-matched load represented by curve 15. It will be appreciated that although curve 15 was developed for a particular load, in this case an electrolyser, this behavior is merely exemplary and not limiting. Similarly high power transfer efficiency may be expected for any load operating at or near $V_{MPP}$.

Figure 2:
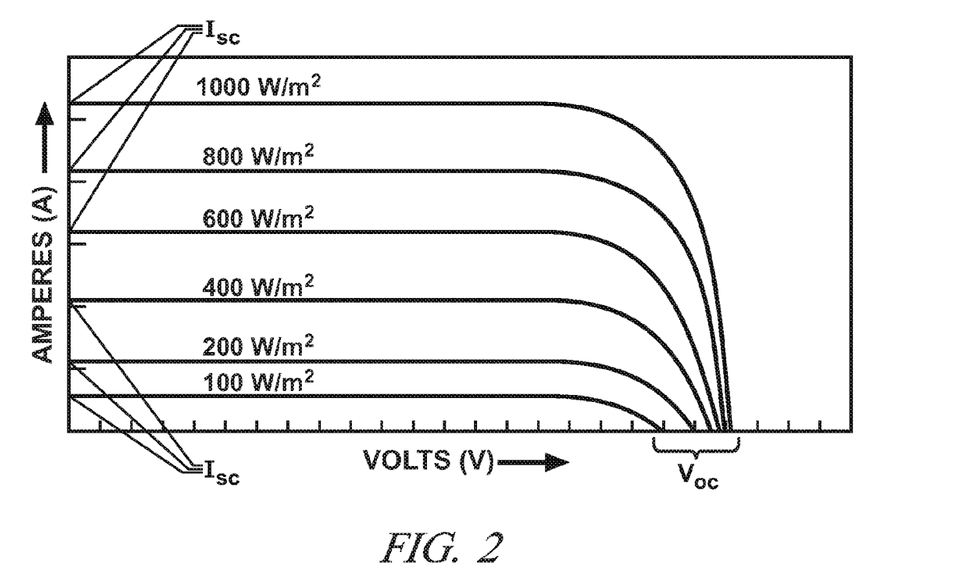
FIG. 2 schematically illustrates the influence of solar irradiance incident on a PV system on the current-voltage response of the system when the PV system is maintained at a constant temperature.
Figure 3:
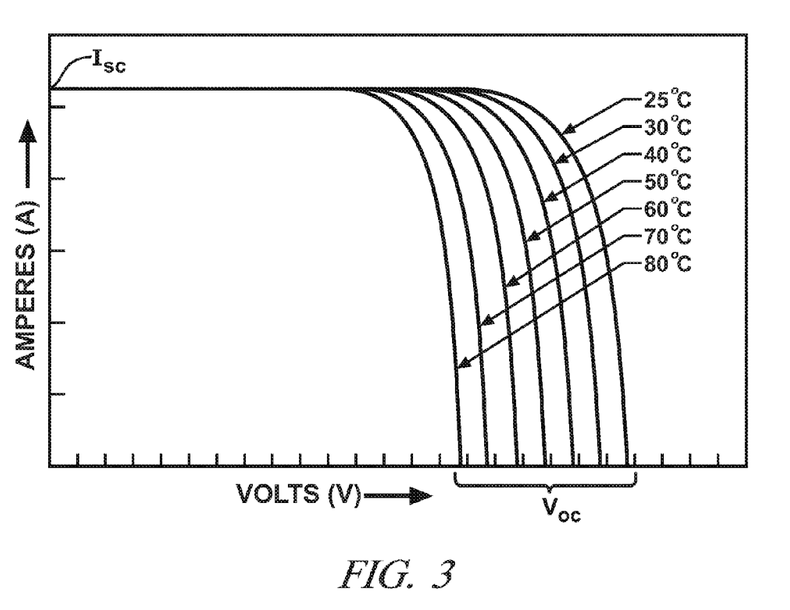
FIG. 3 schematically illustrates the influence of PV system temperature on the current-voltage characteristics of the PV system under a constant level of incident solar irradiance.

The performance of PV power units is commonly specified under standard conditions. These conditions are, typically, 1000 watts/sq. meter of incident solar radiation, under a solar zenith angle of about 48.2° (corresponding to a typical mid-latitude installation) and a cell temperature of 25° C. Under conditions which deviate from these, the performance of a PV power unit will vary. For example, FIG. 2 schematically shows the effect of varying the incident solar irradiation while holding the PV cell temperature constant and indicates that a reduction in the incident radiation will generally proportionately reduce the short circuit current ($I_{SC}$) while also reducing, to a lesser extent, the open circuit voltage ($V_{OC}$). FIG. 3 schematically shows the effects of varying the PV cell temperature under constant incident solar radiation. In this circumstance, the short circuit current ($I_{SC}$) is effectively unaffected but the open circuit voltage ($V_{OC}$) decreases quite rapidly with increased cell temperature.

The inventor has determined that these individual influences of PV system temperature and solar irradiance on PV power unit characteristics may be combined into a single regression model with parameters derived from experimental data. For the Sanyo HIP-190BA3 PV module suitable relations are:

$$V_{OC}, V = 51.49 - (0.1752 \times T\text{system}) + (2.958 \times \ln(\text{irradiance})) \quad (1)$$

$$V_{MPP}, V = 15.70 - (0.1676 \times T\text{system}) + (12.51 \times \ln(\text{irradiance})) - (0.9024 \times (\ln(\text{irradiance}))^2) \quad (2)$$

$$I_{SC}, A = -0.0185 + (0.000559 \times T\text{system}) + (0.00376 \times \text{irradiance}) \quad (3)$$

$$I_{MPP}, A = -0.00599 - (0.000226 \times T\text{system}) + (0.00348 \times \text{irradiance}) \quad (4)$$

where, Tsystem is the PV cell or module temperature in units of ° C. and irradiance is the solar irradiance with units of watts/square meter. Of course, the maximum power, in watts, $P_{MAX}$, can be calculated from $V_{MPP} \times I_{MPP}$.

Figure 4A:
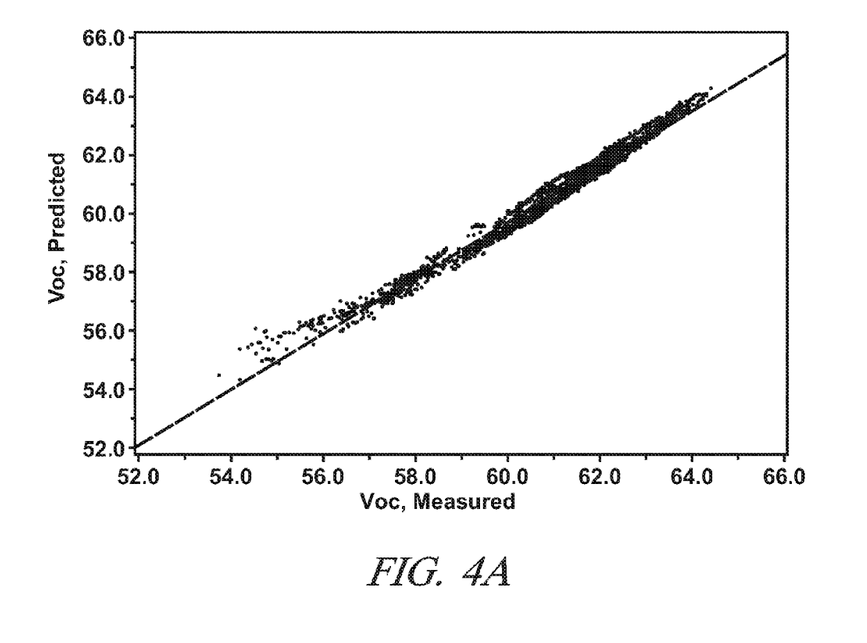
FIG. 4A shows a comparison of modeled and the measured values of open circuit voltage ($V_{OC}$) for a Sanyo HIP-190BA3 PV module. Data were taken over the course of a day during which the solar irradiance varied as shown in FIG. 4B.
Figure 4B:
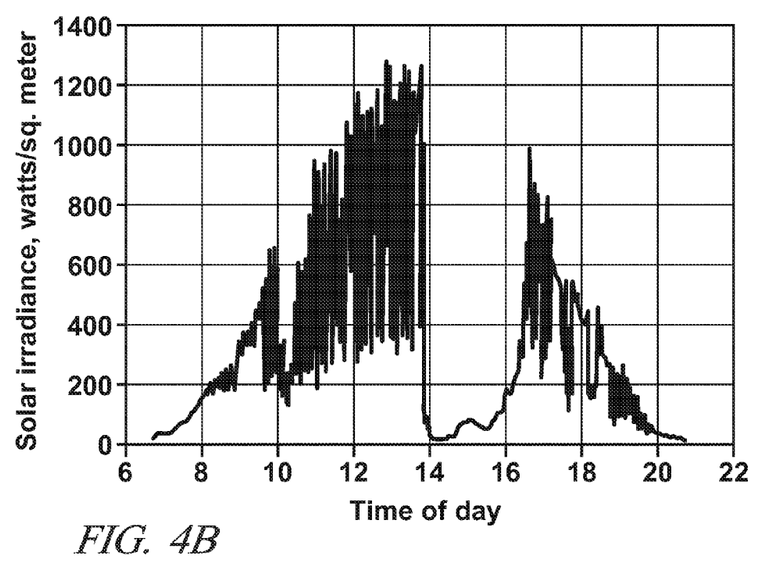

The accuracy and utility of these models may be appreciated by consideration of the comparison of estimated and measured open circuit voltage for a Sanyo HIP-190BA3 PV module shown in FIG. 4A. The data shown in FIG. 4A compare the estimated (using equation 1 above) and the measured values of $V_{OC}$ over a thirteen hour period in a single day. The dashed line is provided only as an aid to the eye. In the course of the day, the solar irradiance varied dramatically as shown in FIG. 4B and included a period of almost 2 hours with significant cloud cover. The model was able to predict $V_{OC}$ to within about 2% over the course of the day. Because $V_{OC}$ and $V_{MPP}$ are highly correlated (correlation coefficient of 0.98) a similarly good correlation holds between modeled and measured $V_{MPP}$. Note that the model was equally effective in estimated $V_{OC}$ during the long term cloud cover event occurring between 14 and 16 hours (FIG. 4B) and the shorter term cloud events, indicated by the brief reductions or (downward) 'spikes' in the solar irradiance, which may be observed throughout the day.

Figure 5:
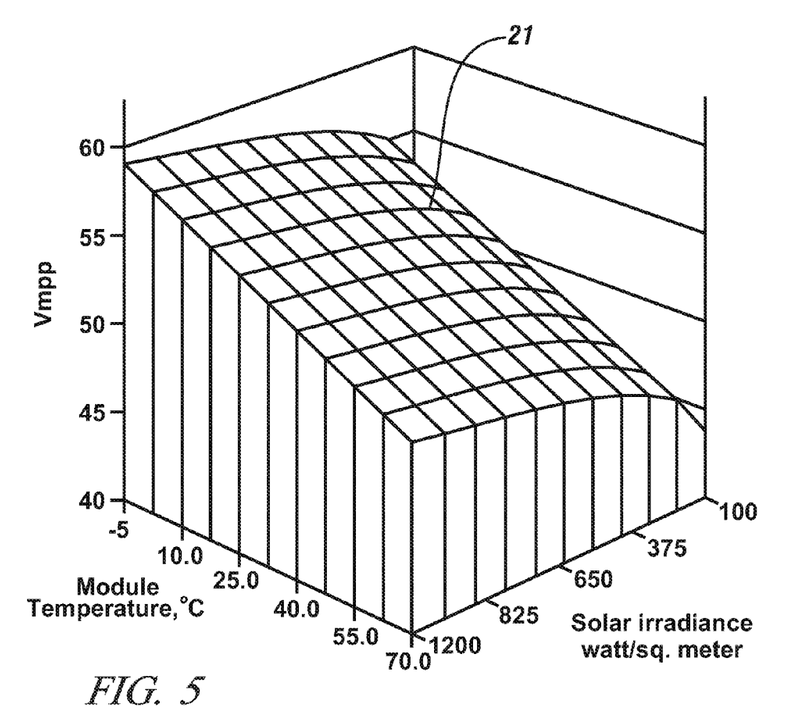
FIG. 5 shows a response surface for a particular PV module (a Sanyo HIP-190BA3 PV) illustrating the combined effects of temperature and solar irradiance on $V_{MPP}$ for this module.

A suitable range of operating conditions for a solar array in temperate latitudes is a temperature range of from about −5° C. to +70° C. and incident solar radiation of between 100 watts/sq. meter and, including reflected light, about 1200 watts/sq. meter. FIG. 5 shows the estimated value of $V_{MPP}$, computed using Equation 2, as system temperature and solar irradiance are varied over substantially these ranges. For ease of viewing, the individual data points have been consolidated into a single response surface 21. Again the particular values shown are characteristic of the previously-discussed Sanyo HIP-190BA3 PV module, but the behavior shown is representative of PV systems generally, as may be seen by consideration of FIGS. 2 and 3.

Solar irradiation may be measured with a pyranometer, which contains a highly absorptive surface whose temperature is measured using a thermopile. As the absorptive surface absorbs solar radiation its temperature rises and the temperature rise, measured by the thermopile, may, if appropriately calibrated, be related to the solar energy incident on the pyranometer. Photodiode-based instruments, which are generally intrinsically less accurate than pyranometers, may also be used, but more robust calibration and compensation procedures should be employed to reduce systematic errors. A photocell may also be used, either as an independent unit or one of the cells of the PV power unit may be dedicated for the purpose. Preferably the irradiance measurement may be accurate to within ±20 watts/sq. meter and more preferably within ±10 watts/sq. meter.

The PV power unit temperature, at the cell or group level, may be measured by any device capable of providing an electrical signal which is proportional to temperature. Such devices may be unpowered, or powered by an external power source (not shown) and may include, among others, thermocouples, thermistors, resistance thermometers and infra-red detectors. Typically temperature measurements may be made on the rear surface of the cell, in many cases using a sensor which may be bonded to the rear surface, possibly with a thermally conductive paste. Such arrangements may not measure the cell temperature at the active p-n junction, but are sufficiently strongly correlated with the junction temperature to serve as effective measures of cell performance. With consistent, standardized sensor application techniques a single set of regression coefficients may be used for common PV cells and groups, but in a PV system with large numbers of PV cells with it may be beneficial to make multiple temperature measurements.

It is preferred to operate the PV power unit at high efficiency, so that it delivers, for example, more than 90% of the power available at $V_{MPP}$. But since $V_{MPP}$ is responsive to current conditions, particularly the solar irradiance and PV power unit or cell temperature, $V_{MPP}$ may vary quite rapidly, due to passing clouds for example. So any attempt to match load requirements to the PV system $V_{MPP}$ may be frustrated unless $V_{MPP}$ is tracked or estimated regularly, say at least about every minute or so.

Figure 6:
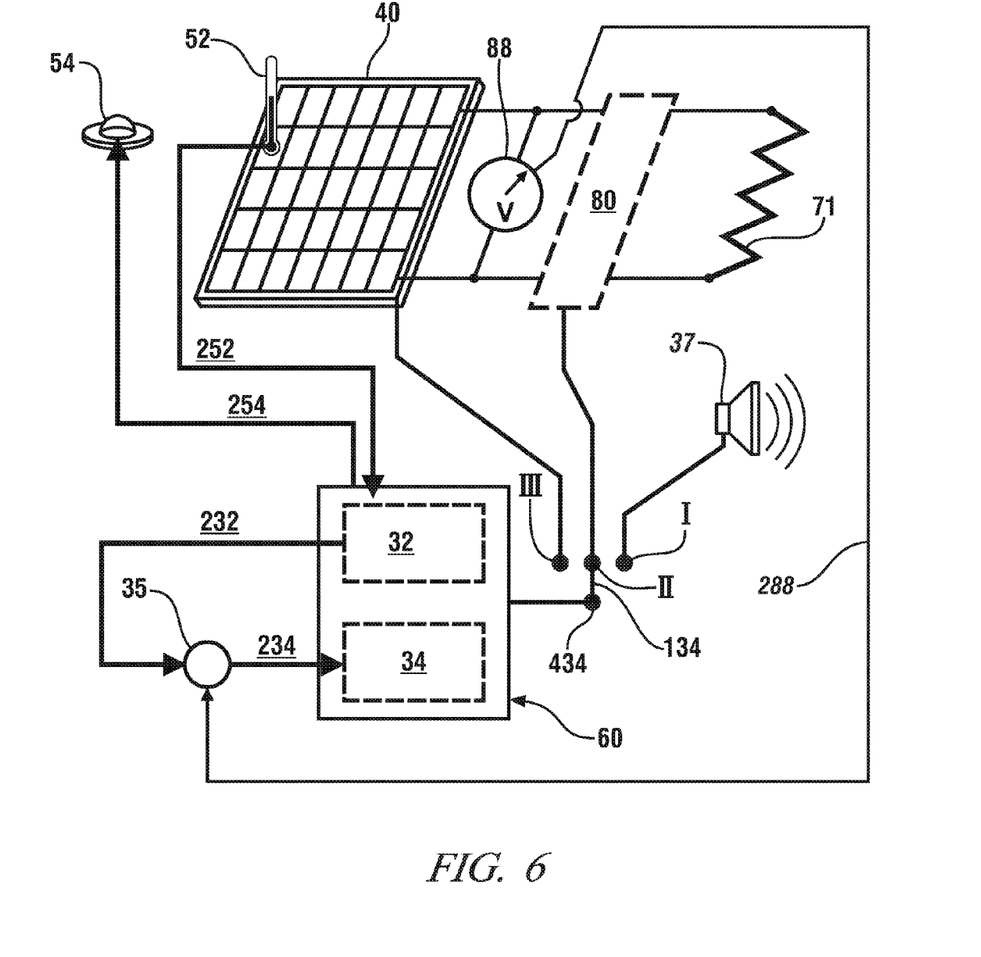
FIG. 6 shows an exemplary overview of three embodiments of the invention.

FIG. 6 provides an overview of the embodiments of the invention. In the following description communication connections between elements, for example between temperature sensor 52 and computational module 32 are depicted and described as wired connections. However, it is intended that wireless connections enabled, for example, using WiFi or cellular telephone networks, may also be used, as may optical or other communication techniques.

As shown in FIG. 6, signals from a PV power unit temperature sensor 52 and solar irradiance sensor 54 are conveyed to controller 60 by wires 252 and 254 respectively. Controller 60 comprises a computational module 32 and a control module 34. The temperature and solar irradiance signals are input to computational module 32 which applies the appropriate regression analyses to compute estimates of the performance of PV power unit 40, here shown as a single packaged grouping of PV cells much like a module. Of particular importance is the estimate of $V_{MPP}$, developed using the regression models containing the PV power unit temperature and incident solar irradiance as shown earlier, and which is conveyed, through wired connection 232, from computational module 32 to summing junction 35.

PV power unit 40 powers load 71, here represented, without limitation, as a pure resistive load. The potential developed by the PV system is measured by voltmeter 88 and conveyed to summing junction 35 by wire 288 for comparison with the estimated value of $V_{MPP}$, developed by computational module 32 of controller 60 and conveyed to summing junction 35 by connection 232. The output of summing junction 35, an error signal, $\Delta V$, is conveyed to the controller module 34 of controller 60 by wire 234. Controller module 34, based on the error signal generated at summing junction 35, outputs a control signal via connection 434. In different embodiments I, II and III, represented by poles I, II and III of switch 134, a series of different controlled outcomes may be selected. In embodiment I, best suited for applications in which the load 71, is adaptable to a wide range of $V_{MPP}$, the controller performs a monitoring and alarm function. Here, any discrepancy, beyond some preset range, between the measured voltage and estimated $V_{MPP}$ will indicate a fault in the PV power unit 40. Examples of such faults may include one or more defective or broken solar cells or a coating of dust, dirt and/or debris from at least a portion of the sun-facing cell or PV power unit surface. Such an embodiment is well suited for example, for monitoring the system performance of remote or unattended facilities with relatively stable electrical requirements. For example, where the PV system feeds power to a storage device such as a battery or even to the power grid. In this embodiment any suitable local alert device, such as a light, siren or loudspeaker 37, may be used to communicate the need for maintenance to appropriate parties. Alerts may also be delivered through e-mail, or other electronic messaging methods or media.

In embodiment II, any discrepancy between the estimated $V_{MPP}$ for the PV power unit and the actual PV power unit voltage is minimized using a voltage control device 80 which may be a convertor (for a direct current or DC load) or an inverter (for an alternating current or AC load) controlled by the control module 34 of controller 60. Such discrepancy may be windowed or thresholded to that corrective action is undertaken only when the discrepancy exceeds some preset value. Effectively voltage control device 80, when properly configured, isolates the load from the PV system so that the PV system may operate at its $V_{MPP}$ and the load may operate at its most optimal voltage. Such direct current to direct current (DC-DC) or direct current to alternating current (DC-AC) convertors with maximum power point tracking have previously been used in an attempt to optimize transfer of power from a PV system to a load. But present systems are challenged by the need to identify $V_{MPP}$ of the PV system under changing climatic and operating conditions which requires perturbing the PV system and making multiple voltage and current measurements. This procedure requires additional instrumentation, an ammeter, and is both expensive and time-consuming. Most importantly the procedure currently in use may lead to an erroneous identification of $V_{MPP}$, particularly under rapidly changing conditions. In this embodiment, the accurate estimation of $V_{MPP}$ afforded by the regression relation between $V_{MPP}$ and the solar irradiance and temperature measurements resolves these issues.

In embodiment III, voltage control device 80 is not required and control module 34 of controller 60 has the capability of physically reconfiguring the PV power unit 40. Additional PV devices (not shown) which may be individual PV cells or groups of such cells, like 40, may be switched into or out of series connection with PV power unit 40 to vary $V_{MPP}$ of the PV system and match it to the requirements of the load.

Figure 7:
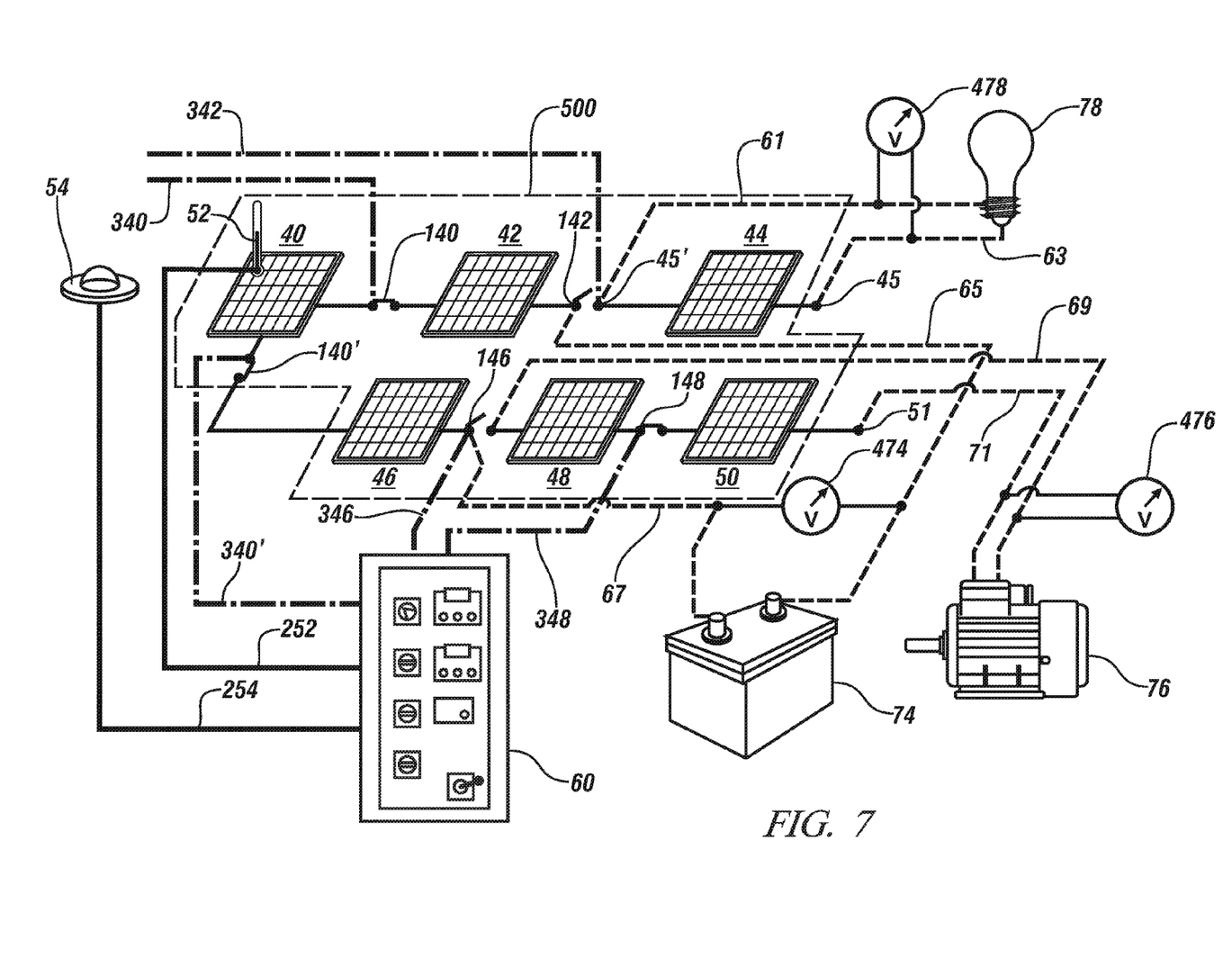
FIG. 7 illustrates a more detailed exemplary implementation of embodiment III (FIG. 6) of the invention. In this embodiment a plurality of electricity-consuming devices is powered by PV system comprising a number of hardwired PV units which may be adaptively connected together responsive to changing device requirements and/or changing climatic conditions.

FIG. 7 shows a more detailed exemplary implementation of embodiment III with a PV system 500 which includes PV cell groupings 40, 42, 44, 46, 48, 50 organized into three PV power units for powering three loads, a lighting load 78, a battery-charging load 74 and a motor load 76. These groupings, if identical, could, without limitation, be modules. The voltage supplied to each of loads 74, 76, 78 is recorded by one of voltmeters 474, 476, 478 associated with the PV power unit for each load and communicated (not shown) to controller 60. Five of the groupings have at least one connector wire incorporating a switch. Grouping 40 has two connector wires each with a switch 140, 140'. Groupings 42, 46, 48 each have connector wires with switches 142, 146, 148 or, generally 1xx where xx is the grouping number. Grouping 50 has a connector wire with connection 51; grouping 44 has connector wires with connections 45, 45'. Each of switches 140, 140', 142, 146, 148 may be operated by controller 60 through its individual control wire 3xx where xx corresponds to the grouping index. For example, control wire 348 controls switch 148 associated with grouping 48. Note that, for simplicity, only the switch-connect portions of control wires 340, 342 have been shown and their continuation and connection to controller 60 have been omitted. Again, because grouping 40 has two switches, 140, 140', it has two associated control wires 340, 340'. Solar irradiance sensor 54 is connected to controller 60 by data wire 254, while temperature sensor 52 is connected to controller 60 by data wire 252.

In the exemplary configuration of FIG. 7, grouping 44 is a PV power unit and powers lighting load 78. Groupings 48, 50 are connected in series to form a second PV power unit which powers motor load 76 and groupings 40, 42, 46, also connected in series constitute yet a third PV power unit which charges battery (load) 74. These connections are overseen by controller 60 which, responsive to temperature and solar irradiance inputs from temperature sensor 52 and incident radiation sensor 54, estimates the maximum power point voltage ($V_{MPP}$) from each of the six groupings. The controller 60 then matches the $V_{MPP}$ capabilities of each of groupings 40, 42, 44, 46, 48, 50 singly or in combination, and possibly in conjunction with other groupings or individual PV cells (not shown) with the measured voltage requirements of each of loads 74, 76, 78. Preferably the controller logic will seek a suitable interconnection of groupings and cells which may enable operation of the groupings at, or near, say about 90% or greater, of their maximum power. This approximately corresponds to maintaining the operating voltage within about ±10% of $V_{MPP}$. After identifying a suitable arrangement, the controller 60, may operate any of the switches, for example switch 140' associated with grouping 40 through its appropriate (switch) control wire, in this case 340' to assemble the groupings into one or more PV power units, each adapted to a specific load. It will be appreciated that, for clarity, all of switches 140, 140', 142, 144 146, 148, 150 have been shown as single pole and that all wiring shown has been suitable for series connection. For some loads, the current output capability of a single PV power unit or grouping may be insufficient to power the load at its desired operating point. As an example, consider battery charging load 74, where the current capability of single grouping may not be sufficient for an intended or specified rate of charge. However, through the use of double-pole switches and appropriate additional wiring (not shown in FIG. 7) series and parallel grouping interconnection may be accomplished so that both voltage and current (or power) requirements may be satisfied.

Communication of controller 60 with sensors 52, 54 may be continuous or intermittent. If intermittent, preferably the controller will interrogate the sensors 52, 54 frequently, at least every minute or so, and more preferably say every 5 or 10 seconds, and reassess whether the present grouping-load interconnection(s) satisfy the present load requirements. If, based on sensor inputs, the voltage difference, that is the difference between the measured operating voltage and the estimated $V_{MPP}$ exceeds a preset value, generally no more than ±10% of $V_{MPP}$, controller 60 may seek to reconfigure the PV power unit. Such a circumstance may be limited to a particular load or to several loads. In either case the controller is tasked with identifying a more efficient arrangement so that the controller may restructure the module connections immediately. More preferably, to minimize the influence of fleeting changes, some means, such as a running average for example, might be employed to smooth the sensor data. Similarly controller 60 might be programmed to respond promptly to changes in cell temperature which is inherently slow to respond to changes in external conditions but to respond less rapidly to changes in solar irradiance which, particularly on days with fast-moving clouds, may be more prone to rapid fluctuation.

Changes which might necessitate restructuring the grouping arrangement may result from changes in the output of the solar groupings, for example due to sun location or the presence or absence of clouds or due to changes in the load requirements, for example the state of charge of battery 74 or the loading of motor 76. The arrangement of FIG. 7 may be used in either case. Also, some tolerance to voltage variation for the loads 74, 76, 78 has been assumed so that a variation in $V_{MPP}$ with variable irradiance or grouping temperature will not decrease (or increase) the voltage sufficiently to render the loads inoperable.

It will be appreciated that the arrangement shown in FIG. 7 is exemplary and not limiting. For example, only a single temperature sensor and a single irradiance sensor are shown and the output from these sensors is used to estimate $V_{MPP}$ for a PV system which may be include many PV cells and extend over a considerable area. For a series of PV cells of nominally identical electrical characteristics, each installed at the same time and each exposed to nominally identical operating conditions, so that aging effects are generally uniform, this may be appropriate.

However, because the performance of interconnected groupings of cells is determined by the lowest-performing member of the group it may be preferred to individually monitor at least each grouping's temperature to estimate the $V_{MPP}$ of each individual grouping. For more precise estimates the solar irradiance on each grouping may be determined. For more grouping-specific solar irradiance data, a plurality of individual sensors, each identified with a particular group and positioned in close proximity to that group may be used. Alternatively, one suitably-calibrated cell of each group may be identified as a reference cell to infer the irradiance for each group individually.

More precise voltage matching may be required to sustain power delivery at about 90% of harvestable solar power or better, particularly for voltages greater than $V_{MPP}$ as shown in FIG. 1. This may be achieved by using, a number of mixed groupings each with a differing (nominal) output voltage or even a mix of groupings and individual solar cells if necessary. Since a typical silicon cell may deliver power at about 0.45 volts, connecting or disconnecting single cells or even small groupings of cells, say ranging from 1-4, offers opportunity for finely matching the electrical needs of the load. Of course, the requirement that each element added to the PV system exhibit the same $I_{MPP}$ as the primary groupings must still be enforced.

Figure 8:
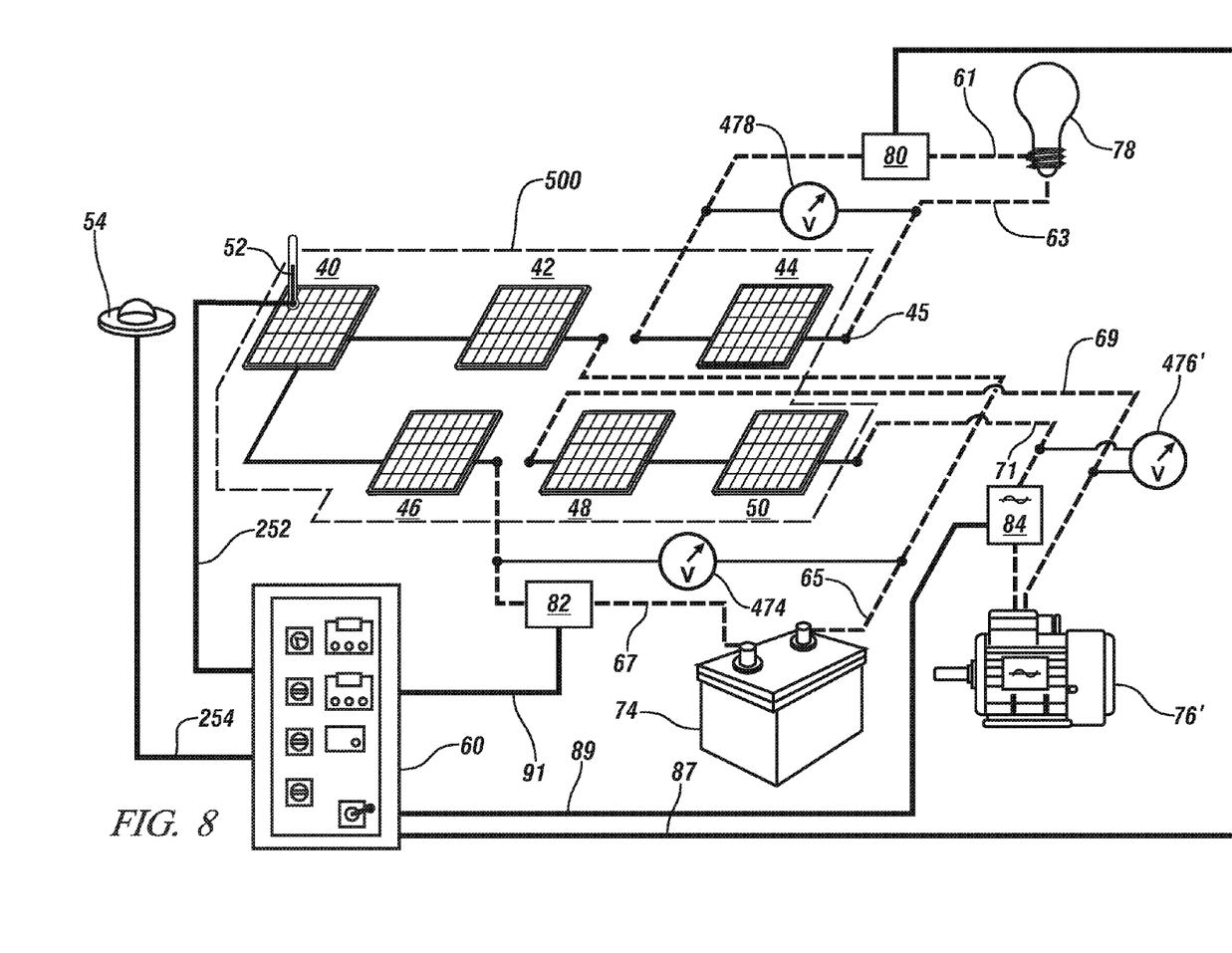
FIG. 8 illustrates a more detailed exemplary implementation of embodiment II (FIG. 6) of the invention. In this embodiment a plurality of electricity-consuming devices is shown powered by a PV system comprising a number of hardwired PV units, the output of which may be adaptively controlled to satisfy the electrical requirements of the devices under changing climatic conditions and/or device operating conditions.

An alternative approach to more precisely match a PV power unit to the requirements of a load using permanently-wired groupings is shown in FIG. 8 which is representative of a configuration suited for practice of embodiment II (as shown in FIG. 6) of the invention.

In the configuration of FIG. 8, PV system 500 includes groupings 40, 42, 44, 46, 48, 50 are hardwired in an arrangement similar to that shown, in switchable configuration, in FIG. 7. Here a PV power unit made up of series-connected groupings 40, 42, 46 charges, through wires 65, 67 battery 74; a PV power unit consisting of groupings 48, 50 power AC motor 76' through wires 69, 71; and single grouping 44 powers lighting load 78 through wires 61, 63. The operating voltages of each PV power unit powering loads 74, 76' and 78 are measured using voltmeters 474, 476' and 478 respectively and the measured voltages are fed back to controller 60 for comparison with the model-estimated values of $V_{MPP}$ to generate an error signal. As before, other grouping configurations and load elements may be substituted without loss of generality. In this embodiment each of the loads has incorporated in one of the power wires a voltage convertor such as 80, 82 (if DC to DC) or a combination of a convertor and inverter such as 84 (if DC to AC). These power convertors indicated as 80, 82, 84 may be controlled by control wires 87, 89, 91 under the direction of controller 60. As before, controller 60 is in communication with solar irradiance sensor 54 and cell temperature sensor 52 and so controller 60 may assess $V_{MPP}$ for each PV power unit as often as temperature and irradiance data are sampled. As depicted, communication between sensors 52, 54 and controller 60 occurs over wires 252, 254 but wireless, optical or other suitable communication methods are comprehended.

Convertors may boost (increase) or buck (decrease) voltage. Units may be designed to do both, a buck-boost convertor, but it is generally simpler to design dedicated units, intended to only increase or decrease voltage. In this embodiment, without limitation, a buck convertor is employed.

The output voltage of any convertor will power an associated load and so must be set to at least the minimum load operating voltage. For a buck convertor this voltage will be substantially equal to the minimum input voltage provided by the PV power unit. So the output voltage of the convertor should be set generally equal to the $V_{MPP}$ expected under the most unfavorable operating conditions for the PV power unit. Under more favorable operating conditions, that is, any combination of higher solar irradiance or lower PV cell temperatures, $V_{MPP}$ will be greater. But with estimates of $V_{MPP}$ based on solar irradiance and temperature data, controller 60 (FIG. 8) may direct the operation of the convertor to step down the voltage and maintain the desired output voltage for the load. Analogous reasoning may be employed to identify the operating requirements when boost or boost-buck convertors are used.

The key to effective operation of this embodiment is knowledge of $V_{MPP}$ under a wide, and possibly rapidly-varying, climatic conditions. But, unlike present systems which seek to identify $V_{MPP}$ by making voltage and current measurements while varying or dithering the load operating voltage, the present invention readily, and with good precision, estimates $V_{MPP}$ using the previously described algorithm based on the measured sensor outputs.

Generally convertors change voltage by employing an inductor, connected to the source, to first store energy from the source. After some preset period, the inductor may be disconnected from the source and connected to the load. Upon connection to the load the inductor may release at least a part of its stored energy to the load. After some second preset period the inductor may be disconnected from the load and reconnected to the source to repeat the cycle.

The ratio of output voltage to input voltage may be adjusted by varying the ratios of the time periods when the inductor is connected to either the load or the source. This time ratio may be controlled by controller 60 through control wires 87, 91 which control an electronic switch (not shown) in each of convertors 80, 82. By controlling the switch using controller 60, the convertor may deliver power at a voltage appropriate to any load. It will be appreciated that the primary adjustment to the voltage delivered to the load is the initial PV power unit configuration, and that the voltage convertor serves only to adjust the grouping-delivered voltage in response to climate-induced grouping voltage reductions. Of course, variable load demands may be similarly accommodated.

For maximum power transfer, the impedance of the source, here the PV grouping(s), should match the impedance of the load, in this case the convertor. The impedance ratio (source to load) varies, like the voltage, with the duty cycle of the convertor and the power efficiency of the convertor. But by operating over only a narrow voltage range and appropriately specifying the electronic components of the convertor, good matching, and efficient power transfer may be achieved. Of course, if the load is not voltage sensitive or at least not sensitive to a modest overvoltage, the duty cycle may be selected to achieve better impedance matching even if it entails lesser control of the output voltage from the convertor.

In the case of loads, such as AC motor 76' (FIG. 8) which require AC power, a DC to AC inverter, for example as represented at 84 in FIG. 8 may be used. It is common to adjust the DC voltage by first passing the output voltage from the solar grouping into a DC to DC convertor and then into a DC to AC inverter. Alternatively, the grouping output may be fed directly to a DC to AC inverter and the AC voltage output stepped up or down as required with a transformer.

The above descriptions of embodiments of the invention are intended to illustrate the invention and not intended to limit the claimed scope of the invention.

The invention claimed is:

1. A load-matched photo-voltaic system for delivery of electricity to one or more electrical power-consuming devices, the system comprising:
    a plurality of photo-voltaic cells, each having connection means to one or more other cells to form at least one photo-voltaic power unit having a maximum power point voltage, each photo-voltaic power unit being adapted to be connected to and powering an associated electrical power-consuming device and at least some of the connection means being remotely operable;
    at least one temperature sensor suitable for determining the temperature of at least one of the photo-voltaic cells;
    at least one irradiance sensor suitable for determining the solar radiation incident on the photo-voltaic cells;
    a voltmeter for each photo-voltaic power unit suitable for determining its output voltage;
    a controller, with data connections suitable for receiving signals from the temperature sensor(s), the incident solar radiation sensor(s) and voltmeter(s);
    the controller having power connections to the remotely operable connection means for operating the remotely operable connection means;
    the controller further comprising a computer for estimating the maximum power output voltage of a selected photo-voltaic power unit and for comparing the estimated maximum power output voltage of the selected photo-voltaic power unit with the measured output voltage of the selected photo-voltaic power unit using the sensor inputs;
    the controller further being suitable for identifying a grouping of interconnected photo-voltaic cells into a photo-voltaic power unit, the photo-voltaic power unit being suitable for delivery of at least 90 percent of the available photo-voltaic system electrical power to its associated power-consuming device based on current data; and
    the controller being capable of effecting such grouping by operation of selected remotely operable connection means.

2. The load-matched photo-voltaic system as recited in claim 1 in which the system is adapted for use under a range of suitable operating conditions comprising a photo-voltaic cell temperature ranging from −5° C. to +70° C. and an incident solar irradiance ranging from 100 watts/sq. meter to 1500 watts/sq. meter.

3. The load-matched photo-voltaic system as recited in claim 1 in which the remotely-operable connection means are relays or solid-state switches.

4. The load-matched photo-voltaic system as recited in claim 1 in which the temperature sensor is one of a thermistor, a thermocouple, a resistance thermometer and an infra-red radiation detector.

5. The load-matched photo-voltaic system as recited in claim 1 in which the irradiance sensor is a pyranometer, a photodiode, a thermopile or a solar cell.

6. A load-matched photo-voltaic system for delivery of electricity at a predetermined voltage to one or more electrical power-consuming devices, the system comprising:
    a plurality of photo-voltaic cells, at least some of the cells being interconnected to form at least one PV power unit having a maximum power point voltage;
    a remotely controllable voltage-changing device adapted to input direct current electricity over a range of voltages and output electricity at a predetermined voltage;
    at least one temperature sensor for determining the temperature of at least one photo-voltaic cell;
    at least one sensor for determining the solar radiation incident on the photo-voltaic cells;
    a voltmeter for measuring the voltage output by each PV power unit;
    a controller, with data connections to the temperature sensor(s), the incident solar radiation sensor(s) and the voltmeter(s), suitable for receiving signals from the sensors and the voltmeters;
    the controller also having controller connections to the remotely controllable voltage-changing device for adjusting the operating conditions of the remotely controllable voltage-changing device;
    the controller further comprising a computer for estimating the maximum power point output voltage of the PV power unit and for comparing the estimated maximum power output voltage of the PV power unit with the measured PV power unit voltage based on sensor inputs; and,
    determining an operating condition for the voltage-changing device suitable for converting the PV power unit output voltage to a predetermined voltage while operating the PV power unit at its maximum power point voltage.

7. The load-matched photo-voltaic system for delivery of electricity to one or more electrical power-consuming devices as recited in claim 6 in which the range of suitable operating conditions comprises a temperature for the PV cells ranging from −5° C. to +70° C. and an incident solar irradiance ranging from 100 watts/sq. meter to 1500 watts/sq. meter.

8. The load-matched photo-voltaic system for delivery of electricity to one or more electrical power-consuming devices as recited in claim 6 in which the remotely operable voltage-changing device comprises a direct current to direct current convertor.

9. The load-matched photo-voltaic system for delivery of electricity to one or more electrical power-consuming devices as recited in claim 8 in which the convertor is a buck convertor.

10. The load-matched photo-voltaic system for delivery of electricity to one or more electrical power-consuming devices as recited in claim 6 in which the temperature sensor is one of a thermistor, a thermocouple, a resistance thermometer and an infra-red radiation detector.

11. The load-matched photo-voltaic system for delivery of electricity to one or more electrical power-consuming devices as recited in claim 6 in which the solar irradiance sensor is a pyranometer, a photodiode, a thermopile or a solar cell.

12. A method of operating a number of electric power-consuming devices, each having a preferred operating voltage, using a photo-voltaic system under solar irradiation, the photo-voltaic system comprising a plurality of solar photo-voltaic cells with a temperature, at least some of which are grouped and connected to form a plurality of photo-voltaic power units equal in number to the number of electric power-consuming devices, each photo-voltaic power unit being adapted for delivery of electrical power to an associated one of the electric power-consuming devices, the electrical power being delivered at the preferred operating voltage of the device, the method comprising:

determining the present output voltages of each photo-voltaic power unit;

estimating the present maximum power point voltage of each photo-voltaic power unit using an algorithm and knowledge of the solar irradiance and the photo-voltaic cell temperature;

modifying the operating mode of each photo-voltaic power unit as required, until each of the power units is operating at substantially its maximum power point voltage and the power unit is delivering electricity to its associated power-consuming device at its preferred operating voltage; and repeating the above steps at generally uniform time intervals.

13. The method of operating a photo-voltaic system comprising a plurality of solar photo-voltaic cells recited in claim 12 in which the operating mode of the photo-voltaic power unit is modified by addition or removal of one or more photo-voltaic solar cells.

14. A method of operating a photo-voltaic system comprising a plurality of solar photo-voltaic cells recited in claim 12 in which the photo-voltaic power system further comprises a voltage convertor and the operating mode of the photo-voltaic system is modified by adjusting the operation of the voltage convertor.

15. The method of operating a photo-voltaic system comprising a plurality of photo-voltaic power units recited in claim 12 in which the generally uniform time intervals are about a minute or shorter.

16. The method of operating a photo-voltaic system comprising a plurality of photo-voltaic power units recited in claim 14 in which the voltage convertors are one or more of boost convertors, buck convertors and boost-buck convertors.

17. The method of operating a photo-voltaic system comprising a plurality of photo-voltaic power units recited in claim 12 further comprising issuing an alert if a difference between the measured voltage delivered to an electric power-consuming device and the estimated photo-voltaic power unit maximum power point voltage exceeds a predetermined value.

18. The method of operating a photo-voltaic system comprising a plurality of photo-voltaic power units recited in claim 12, in which the method is performed under a range of operating conditions comprising a temperature for the photo-voltaic cells ranging from −5° C. to +70° C. and an incident solar irradiance ranging from about 100 watts/sq. meter to 1500 watts/sq. meter.

* * * * *